(12) United States Patent
Iwata (10) Patent No.: US 11,277,774 B2
(45) Date of Patent: Mar. 15, 2022

(54) COMMUNICATION APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Toshihiro Iwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/752,510

(22) Filed: Jan. 24, 2020

(65) Prior Publication Data
US 2020/0245196 A1 Jul. 30, 2020

(30) Foreign Application Priority Data

Jan. 30, 2019 (JP) .............................. JP2019-014242

(51) Int. Cl.
    *H04W 4/00*     (2018.01)
    *H04W 36/00*     (2009.01)
    *H04W 4/80*     (2018.01)

(52) U.S. Cl.
    CPC ......... *H04W 36/0022* (2013.01); *H04W 4/80* (2018.02); *H04W 36/0038* (2013.01); *H04W 36/0077* (2013.01)

(58) Field of Classification Search
    CPC ............... H04W 36/0022; H04W 4/80; H04W 36/0038; H04W 36/0077; H04W 84/20; H04L 67/303; H04L 67/12
    USPC ........................................ 370/331, 329, 342
See application file for complete search history.

(56) References Cited

U.S. PATENT DOCUMENTS

| 8,526,778 | B2 * | 9/2013 | Lee ................... H04N 5/232935 |
| | | | 386/224 |
| 9,396,633 | B1 * | 7/2016 | Sannala ................. G08B 17/10 |
| 9,456,231 | B2 * | 9/2016 | Kulkarni .............. H04N 21/632 |
| 9,460,123 | B1 * | 10/2016 | Strutt ...................... G06F 16/51 |
| 9,794,522 | B2 * | 10/2017 | Sannala ................ G08B 17/10 |
| 10,091,406 | B2 * | 10/2018 | Oh ........................ H04N 5/2252 |
| 10,387,486 | B2 * | 8/2019 | Higashibeppu ........ G11B 27/00 |
| 10,944,894 | B2 * | 3/2021 | Iwata .................. H04L 41/0873 |
| 2002/0116460 | A1 | 8/2002 | Treister |

(Continued)

FOREIGN PATENT DOCUMENTS

| EP | 1548985 A1 | 6/2005 |
| EP | 3144914 A1 | 3/2017 |

(Continued)

*Primary Examiner* — Marceau Milord
(74) *Attorney, Agent, or Firm* — Canon U.S.A., Inc. I.P. Division (57) ABSTRACT

A communication apparatus acquires, from an outside, first setting information for controlling the communication apparatus, sets the first setting information in the communication apparatus, establishes wireless communication with a different communication apparatus, hands over second setting information, which indicates the authority of the different communication apparatus in the wireless communication, from the different communication apparatus via the established wireless communication, sets the second setting information in the communication apparatus, and controls the establishment of the wireless communication and the setting of the second setting information in the communication apparatus when the first setting information is set in the communication apparatus.

12 Claims, 6 Drawing Sheets

(56) References Cited

U.S. PATENT DOCUMENTS

| | | | |
|---|---|---|---|
| 2007/0047481 A1 | 3/2007 | Fair | |
| 2007/0110169 A1* | 5/2007 | Nassor | H04N 21/21815 375/240.26 |
| 2010/0103457 A1* | 4/2010 | Nakamura | H04L 29/12264 358/1.15 |
| 2011/0082909 A1* | 4/2011 | Ishibashi | H04L 41/12 709/217 |
| 2011/0153815 A1* | 6/2011 | Aoki | H04L 61/2046 709/224 |
| 2013/0113944 A1* | 5/2013 | Fukushima | H04N 5/225 348/207.1 |
| 2013/0247117 A1* | 9/2013 | Yamada | G08C 17/02 725/93 |
| 2013/0275588 A1* | 10/2013 | Li | H04L 43/0823 709/224 |
| 2014/0362864 A1* | 12/2014 | Sugimoto | H04L 45/24 370/400 |
| 2014/0372575 A1* | 12/2014 | Ishimura | H04L 61/2015 709/220 |
| 2018/0081909 A1* | 3/2018 | Higashibeppu | G06F 16/5866 |
| 2019/0361694 A1* | 11/2019 | Gordon | G06F 1/169 |

FOREIGN PATENT DOCUMENTS

| | | |
|---|---|---|
| JP | 2015-142368 A | 8/2015 |
| JP | 2015-226324 A | 12/2015 |
| WO | 2010/097964 A1 | 9/2010 |

* cited by examiner

COMMUNICATION APPARATUS, CONTROL METHOD OF COMMUNICATION APPARATUS, AND STORAGE MEDIUM

BACKGROUND OF THE INVENTION

Field of the Invention

The present invention relates to a communication apparatus that can be replaced in a wireless communication network.

Description of the Related Art

In recent years, along with the advancement of the Internet of Things (IoT), a network that collects sensor data from communication devices having sensor functions have been available. In such a sensor network, a wireless communication network is often used because of its simplified installation and operation.

As a wireless communication standard for the IoT, some wireless communication standards are available including ZigBee® and Z-Wave®.

If wireless network devices perform wireless communication, each of the devices needs to cooperate with each other to execute registration processing for joining the wireless communication network. Information exchange processing (pairing) is also executed as necessary to execute data encryption.

In the case of the Z-Wave standard described above, registration processing for a network, called inclusion, is executed by a user executing specific manipulation for each of a master unit and the slave unit. Specifically, the registration processing starts when the user performs manipulation such as pressing buttons at both the master unit and the slave unit within a predetermined time. Upon the registration processing starts, the master unit transitions the state thereof to an adding mode, and the slave unit transitions the state thereof to a learning mode. Thereby, the master unit and the slave unit can exchange, for example, device identifiers (e.g., device types) required for the wireless communication, and key information for data encryption.

In a case of replacement of the master unit, which has undergone such registration processing, with a new unit due to aging degradation or trouble, the slave unit must be registered with the new master unit to establish a wireless communication network again. To reestablish such a wireless communication network, the pushing button manipulation described above is normally needed for each slave unit. Thus, the registration processing becomes very time-consuming especially when a large number of slave units (e.g., several tens of units) are included in the wireless communication network. For this reason, a handover function (replacement function) has been provided. Using this function, information of the wireless communication network already established can be handed over from an old master unit to a new master unit through wireless communication.

In the case of the Z-Wave standard described above, a new master unit is first registered as a slave unit of an old master unit, and then the handover processing of the master unit function is executed through wireless communication. This enables the old master unit to hand over the existing wireless communication network to the new master unit without executing individual registration processing (inclusion) again with each slave unit.

Meanwhile, as a general method of handing over setting values during device replacement, there is a method of restoring backup data extracted in advance from a device, a replacement target, to a new device via an external medium such as a secure digital (SD) card. For example, to replace a network camera on a wireless communication network, camera control parameters such as an aperture and zoom, network settings such as an Internet Protocol (IP) address, and the like can be extracted as backup data and handed over to a replacement destination device via an external medium.

Japanese Patent Application Laid-Open No. 2015-226324 discusses a technique for detecting a connection of a new camera to a camera network, determining whether the new camera is a camera for replacing a specific camera, and placing the new camera on the camera network using configuration settings of the specific camera.

Japanese Patent Application Laid-Open No. 2015-142368 discusses a technique for detecting installation of a new device for replacement, preparing distribution data that matches the model information of the new device extracted from backed up setting value information of a device to be replaced, and distributing the prepared data to the new device.

In the Z-Wave standard however, executing the handover processing of the master unit function through wireless communication is necessary to hand over a master unit function to a new master unit as described above. Thus, the handover of the master unit function is not completed only by simply restoring the backup data to the new master unit. Specifically, in the case of Z-Wave compatible devices, a user must execute, in addition to the restoration of the backup data as described above, the registration processing (inclusion) of a new master unit as a slave unit through wireless communication and the handover processing of the master unit function from the old master unit to the new master unit. The necessity of such additional processing has complicated the replacement work for the master unit.

Furthermore, to hand over the master unit function to a Z-Wave compatible device, a new master unit needs to execute the inclusion as a slave unit to establish wireless communication. Thus, the user manipulation needed for the inclusion described above is required for both the old and new Z-Wave compatible devices that are to be connected. In other words, the user must operate both devices, which are used for the handover of the master unit function, in order and within a predetermined time, and thus the replacement procedure of the master unit becomes more complicated as the wireless communication network becomes larger.

As described above, to hand over the master unit function of the Z-Wave compatible device from the old master unit to the new master unit to replace the master unit, the user must first activate and operate the inclusion processing of the new master unit to establish the wireless communication.

Therefore, even if the backup data of the old master unit can be restored to the new master unit, the user cannot solve the complication of the inclusion of the new master unit and the handover processing of the master unit function to the new master unit, which are to be executed thereafter.

SUMMARY OF THE INVENTION

According to an aspect of the present invention, a communication apparatus includes a first setting unit configured to acquire, from an outside, first setting information for controlling the communication apparatus and to set the first setting information in the communication apparatus, an establishment unit configured to establish wireless communication with a different communication apparatus, a second setting unit configured to hand over second setting information, which indicates the authority of the different communication apparatus in the wireless communication, from the different communication apparatus via the wireless communication established by the establishment unit and set the second setting information in the communication apparatus, and a control unit configured to control the establishment unit to establish the wireless communication and to control the second setting unit to set the second setting information in the communication apparatus when the first setting information is set in the communication apparatus by the first setting unit.

Further features of the present invention will become apparent from the following description of exemplary embodiments with reference to the attached drawings.

DESCRIPTION OF THE EMBODIMENTS

Hereinafter, exemplary embodiments for carrying out the present invention will be described in detail with reference to the attached drawings. The exemplary embodiments described below are examples of means to realize the present invention. Configurations of apparatuses and various conditions to which the present invention is applied should be modified or changed as appropriate, and the present invention is not necessarily limited to the exemplary embodiments below. In addition, not all combinations of the features described in the exemplary embodiments are essential for the solving means of the present invention. The same configuration elements are denoted by the same reference signs to be described.

Hereinafter, an example will be described in which a communication apparatus is a network camera connected to a wireless communication network, and the network camera is replaced with a new network camera. However, the present exemplary embodiment is not limited thereto. The communication apparatus may be any wireless communication device.

Further, an example will be described in which the wireless communication network having the communication apparatus is configured by Z-Wave®. However, the present exemplary embodiment is not limited thereto. The wireless communication network having the communication apparatus may be in accordance with a communication standard, such as ZigBee®, and Bluetooth®, that are different wireless communication standards for the Internet of Things (IoT). The wireless communication network having the communication apparatus may also be any wireless communication network in accordance with, for example, Bluetooth Low Energy (BLE), and Wi-Fi®.

Network Configuration According to Present Exemplary Embodiment

Figure 1:
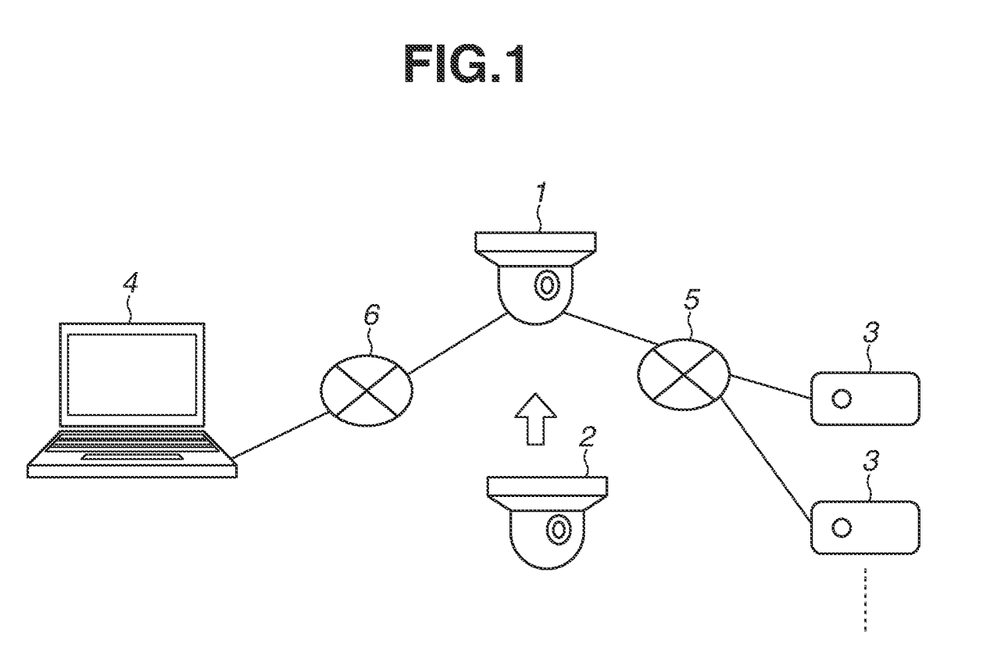
FIG. 1 is a block diagram illustrating an example of a network configuration of a network camera system according to the present exemplary embodiment.

FIG. 1 is a block diagram illustrating an example of a network configuration of a network camera system according to the present exemplary embodiment.

The network camera system illustrated in FIG. 1 includes a network camera 1 that operates as a master unit in accordance with the Z-Wave standard, sensor devices 3 that operate as slave units in accordance with the Z-Wave standard, and an information terminal 4. The network camera 1 and the sensor devices 3 are wirelessly connected via a wireless network 5. The network camera 1 and the information terminal 4 are connected via any network (e.g., a network 6) that may be wired or wireless.

In FIG. 1, the network camera 1 is an old network camera (replacement origin camera), which is a replacement target. The network camera 1 can distribute videos via the wired or wireless network 6. Other apparatuses including the information terminal 4 can send various kinds of camera control to the network camera 1. The network camera 1 can perform communication in accordance with the Z-Wave standard.

In FIG. 1, a network camera 2 is a new network camera (replacement destination camera) for replacing the network camera 1. The network camera 2 is a device that can perform wireless communication in accordance with at least the Z-Wave standard. The network camera 2 can perform wireless communication with the network camera 1 by being connected to the wireless network 5. The network camera 2 has a function that can replace a function of the network camera 1.

In the present exemplary embodiment, the network camera 2 is described to have the same internal configuration as the network camera 1. However, the network camera 2 may not necessarily have the same internal configuration as long as the network camera 2 has a function that can replace a function of the network camera 1.

Each of the sensor devices 3 is connected to the network camera 1 via the wireless network 5. Each of the sensor devices 3 can transmit, to the network camera 1, numerical data (e.g., a temperature, and humidity) detected by the sensor device 3 using a profile defined by the Z-Wave standard.

Each of the sensor devices 3 can also receive, from the network camera 1, ON/OFF information and the like for controlling the sensor device 3. Although two sensor devices 3 are illustrated in FIG. 1, the number of sensor devices 3 is not limited to two. Any number of one or more sensor devices 3 may operate as Z-Wave slave units on the wireless network 5.

The information terminal 4 is connected to the network camera 1 via the network 6. The information terminal 4 can output information transmitted from the network camera 1 via a browser running on the information terminal 4, and execute various camera control transmitted to the network camera 1. The information terminal 4 may also be connected to the network camera 2 via the network 6.

The wireless network 5 enables mutual communication between the network camera 1 and the sensor devices 3 in accordance with the Z-Wave standard. In this Z-Wave mutual communication, the network camera 1 functions as a master unit to register and manage each of the sensor devices 3 on the wireless network 5. Meanwhile, each of the sensor devices 3 functions as a slave unit to be registered and managed by the network camera 1 on the wireless network 5.

The network 6 is a network for distributing videos captured by the network camera 1 to, for example, an external recording server (not illustrated). In the present exemplary embodiment, the network 6 may be, for example, a wired local area network (LAN) that conforms to a communication standard such as Ethernet®. Alternatively, the network 6 may be a wireless network. This wireless network includes a wireless personal area network (PAN) such as Bluetooth®, ZigBee®, or ultra wideband (UWB). The wireless network further includes a wireless LAN (e.g., wireless fidelity (Wi-Fi®)), and a wireless metropolitan area network (MAN) (e.g., WiMAX®). A wireless wide area network (WAN) such as LTE/3G is also included. The network 6 only needs to be able to connect the devices so that the devices can communicate with each other, and the standard, scale, and configuration of the network 6 are not limited to the above.

Figure 2:
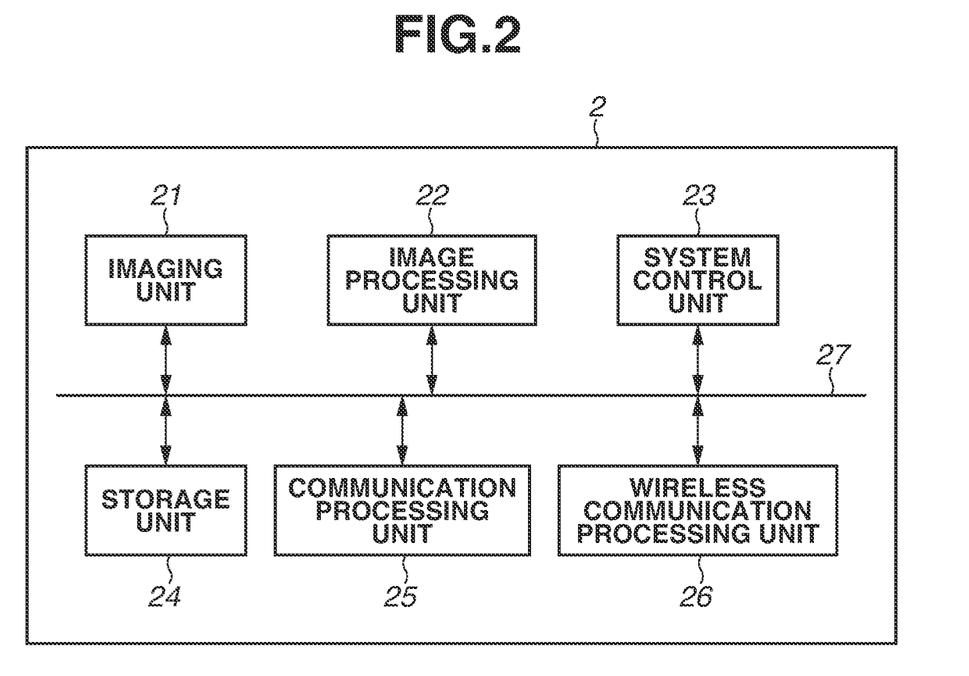
FIG. 2 is a block diagram illustrating an example of a hardware configuration and a functional configuration of the communication apparatus included in the network illustrated in FIG. 1.

Hardware Configuration and Functional Configuration According to Present Exemplary Embodiment FIG. 2 is a block diagram illustrating an example of a hardware configuration and a functional configuration of the replacement destination network camera 2, which configures the network camera system according to the present exemplary embodiment, for replacing the network camera 1.

A function realized by software, which is among those of functional modules included in the network camera 2 illustrated in FIG. 2, is achieved by storing a program for providing the function of the functional module in a memory such as a read only memory (ROM), reading out the program in the ROM and loading the program to a random access memory (RAM), and executing the program by a central processing unit (CPU). For a function realized by hardware, for example, only a dedicated circuit needs to be generated automatically on a field programmable gate array (FPGA) from a program for realizing the function of each functional module by using a predetermined compiler. A gate array circuit may be formed in the same manner as the FPGA to be realized as the hardware. Furthermore, the hardware may be realized by an application specific integrated circuit (ASIC). The functional block configuration illustrated in FIG. 2 is an example, and a plurality of functional blocks may constitute one functional block, or any one of the functional blocks may be divided into a plurality of functional blocks.

The network camera 2 includes an imaging unit 21, an image processing unit 22, a system control unit 23, a storage unit 24, a communication processing unit 25, and a wireless communication processing unit 26. The imaging unit 21, the image processing unit 22, the system control unit 23, the storage unit 24, the communication processing unit 25, and the wireless communication processing unit 26 are connected to each other via a system bus 27.

The imaging unit 21 is constituted by a lens and an imaging element, captures an image of a subject, and executes conversion of the captured image into an electric signal.

The image processing unit 22 executes image processing and encoding processing on the electric signal converted by the imaging unit 21, and generates image data.

The system control unit 23 analyzes a camera control command received by the network camera 2, and executes processing based on the analyzed command. The system control unit 23 also detects changes in parameters stored in the network camera 2, and executes various processing by using the detected event as a trigger.

The storage unit 24 stores setting values (setting information) including camera control parameters for image quality adjustment such as an aperture and shutter speed, a camera control parameter for viewing angle adjustment such as a preset value, and a setting value including a network parameter such as an Internet Protocol (IP) address to be set in Ethernet. The storage unit 24 includes a nonvolatile memory that enables activation by using previously set setting values even when the network camera 2 is reactivated.

The setting values stored in the storage unit 24 can be written in an external storage medium, such as a secure digital (SD) card, as backup data. In the present exemplary embodiment, when replacing a device such as the network camera 1, the same setting values can be written into the device to be replaced such as network camera 2, to restore by using the written out backup data. The communication processing unit 25 executes various processing for network communication by a wired LAN or a wireless LAN.

The wireless communication processing unit 26 executes various processing for wireless network communication between the network camera 2 and the sensor devices 3.

The network camera 1 has a function equivalent to that of the network camera 2, and includes at least each processing unit illustrated in FIG. 2.

<Handover Processing Flow of Master Unit Function by Network Camera 2>

Hereinafter, an example of a handover processing flow will be described with reference to FIG. 3. The processing is executed by the network camera 2 in the present exemplary embodiment. The master unit function in the Z-Wave standard is handed over from the network camera 1.

Figure 3:
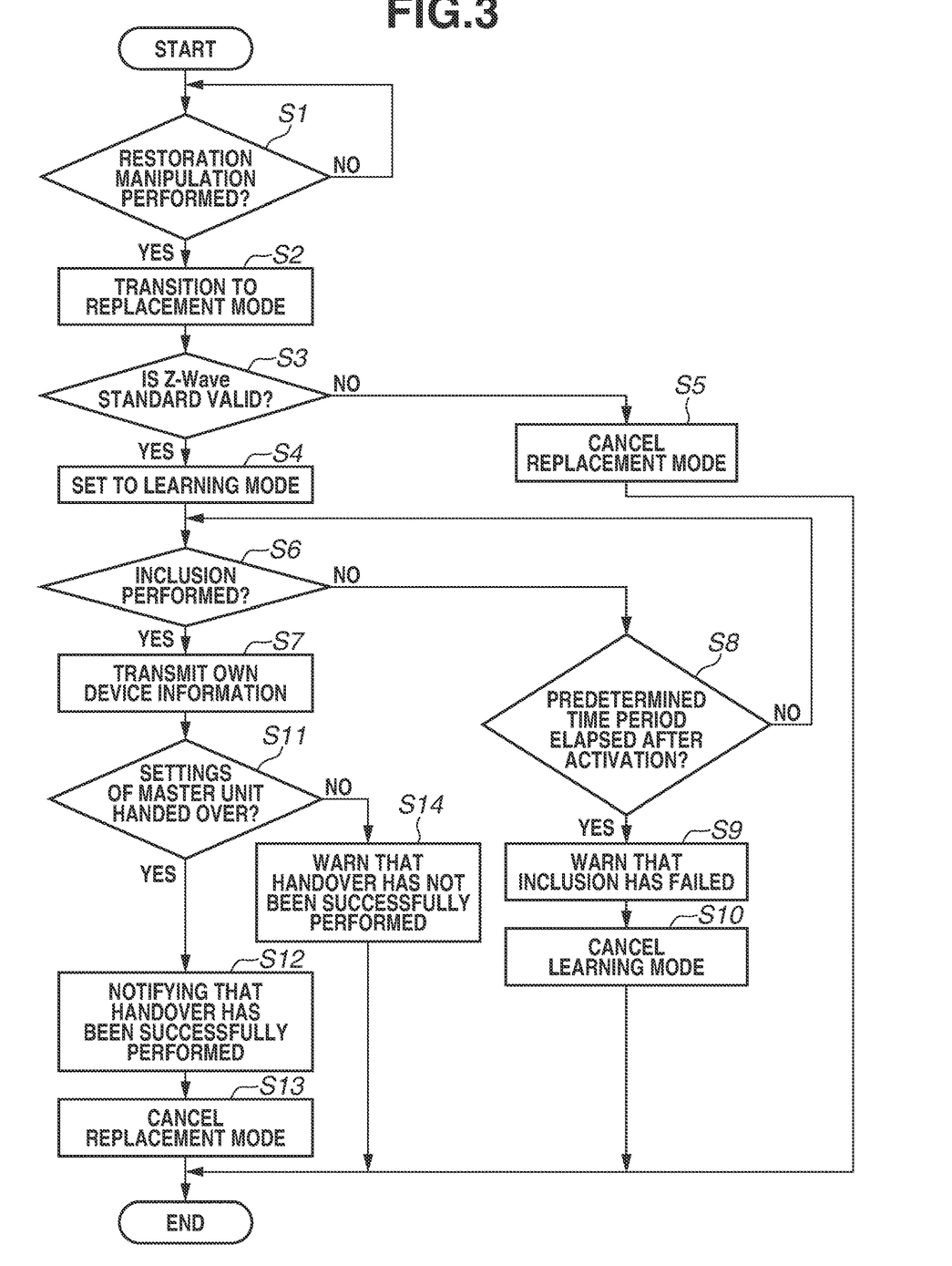
FIG. 3 is a flowchart illustrating an example of a detailed processing procedure for handover processing at the time of replacement with a replacement destination communication apparatus according to the present exemplary embodiment.

The processing illustrated in FIG. 3 starts, for example, when the network camera 2 is activated. However, the start timing of the processing illustrated in FIG. 3 is not limited to the above. For example, the processing may be started by a user inputting instruction to start the processing via the manipulation unit of the network camera 2 or through remote manipulation. The network camera 2 can execute the processing illustrated in FIG. 3 by causing the system control unit 23 to read out the necessary program from the storage unit 24 and executing the program. The processing of FIG. 3 may be realized by at least some of the elements illustrated in FIG. 2 operating as the dedicated hardware. In this case, the dedicated hardware operates based on the control by the system control unit 23.

In step S1, the system control unit 23 detects that the restoration manipulation has been performed for the setting values to be set in the network camera 2. This restoration manipulation for the setting values is performed, for example, by inserting an SD card, which has stored the backup data in advance, into the network camera 2, and activating the network camera 2 from the information terminal 4 by the user via a user interface. Alternatively, the restoration manipulation may be automatically executed with an insertion of the SD card as a trigger.

The restoration manipulation according to the present exemplary embodiment is not limited to the above and can be in any form as long as the restoration manipulation restores the setting values to the network camera 2. For example, the restoration manipulation may be executed by preparing the backup data on a server in advance and by downloading the backup data to the network camera 2 via a network.

If the restoration manipulation for the setting values has been performed to the network camera 2 (YES in step S1), the processing proceeds to step S2. If the restoration manipulation is not performed (NO in step S1), the processing returns to step S1 to repeat the processing.

In step S2, the system control unit 23 transitions to a replacement mode to hand over the master unit function in the Z-Wave standard from the network camera 1. Specifically, for example, the storage unit 24 may hold a flag (flag information), inside the storage unit 24, indicating whether the restoration manipulation has been performed. In step S1, if the restoration manipulation has been performed, the system control unit 23 can change the flag held by the storage unit 24 from off to on to transition to the replacement mode by rewriting a specific register value.

The network camera 2 may need to be reactivated in some cases due to changes in the setting values when the setting values is restored. Thus, in the present exemplary embodiment, the system control unit 23 of the network camera 2 may store, in a nonvolatile storage apparatus, a flag indicating whether the restoration manipulation has been performed so that the replacement mode can be maintained even after the reactivation. However, the configuration of the replacement mode using the above-described flag is an example and can be in any form as long as the configuration of the replacement mode can determine a mode that hands over the master unit function in the Z-Wave standard.

After the transition to the replacement mode in step S2, the processing proceeds to step S3. In step S3, the system control unit 23 determines whether the Z-Wave function is set to be valid. Specifically, the system control unit 23 acquires the setting values restored from the storage unit 24, refers to the acquired setting values, and determines whether the Z-Wave function is set to be valid. When the Z-Wave function is valid (TES in step S3), the processing proceeds to step S4. When the Z-Wave function is invalid (NO in step S3), it is not necessary to hand over the master unit function in the Z-Wave standard. Thus, the processing proceeds to step S5 to cancel the replacement mode, and the processing ends.

In step S4, the system control unit 23 shifts the network camera 2 to a learning mode. By shifting to the learning mode, the network camera 2 is transitioned to a state that the network camera 2 can undergo the inclusion, as a slave unit in the Z-Wave standard, to the network in the Z-Wave standard configured by the network camera 1 (the master unit).

The Z-Wave standard usually requires user manipulation such as pressing buttons to set the learning mode. However, the Z-Wave compatible device can automatically shift to the learning mode in the case of the replacement mode. In the present exemplary embodiment, the restoration manipulation for the setting values is detected and automatically transitioned to the replacement mode. Thus, the user manipulation is reduced for shifting to the learning mode, which is an operation mode that enables the inclusion from the master unit via the wireless network 5.

In step S4, the network camera 2 automatically shifts to the learning mode. Thus, the network camera 2 is in a state that the network camera 2 can establish wireless communication connection with the network camera 1 in accordance with the Z-Wave standard. Specifically, in step S4, the wireless communication processing unit 26 of the network camera 2 establishes wireless communication with the network camera 1 via the wireless network 5 in the Z-Wave standard, and waits for the inclusion from the network camera 1. The "establishing wireless communication" herein includes shifting to a state that the network camera 2 can establish wireless communication in response to a connection request from a different device via the wireless network 5.

In step S6, the system control unit 23 of the network camera 2 detects that the inclusion has been performed from the network camera 1.

If the inclusion has been performed (YES in step S6), the network camera 2 is registered as a slave unit of the network camera 1 as the master unit, and the processing proceeds to step S7. In the Z-Wave standard, if the slave unit undergoes the inclusion, a home identification (ID) is assigned from the master unit. This home ID is a numerical value representing a network to which the slave unit belongs. If the slave unit does not belong to any network, the slave unit does not have a home ID.

Specifically, the system control unit 23 can detect that the inclusion has been performed by the network camera 1 by detecting that the home ID has been assigned to the network camera 2.

On the network camera 1 side, if the network camera 2 undergoes the inclusion, the network camera 1 identifies the network camera 2 as a replacement camera, and automatically executes the handover processing (handover operation) of the master unit function. The details of this handover operation will be described below with reference to FIG. 6.

If the inclusion is not performed (NO in step S6), the processing proceeds to step S8. In step S8, the system control unit 23 determines whether a predetermined time has elapsed after the network camera 2 is activated. If the predetermined time has not elapsed (NO in step S8), the processing returns to step S6 to repeat the processing of step S6. If the predetermined time has elapsed after the network camera 2 is activated (YES in step S8), the system control unit 23 determines that the inclusion has failed, and processing proceeds to step S9. In step S9, the system control unit 23 outputs a warning to the user. In step S10, the system control unit 23 cancels the learning mode, and ends the processing.

Canceling the learning mode in step S10 is to avoid unavoidably being connected to a master unit other than the desired master unit if the network camera 2 continues to operate in the learning mode even after the inclusion has failed.

Figure 4:
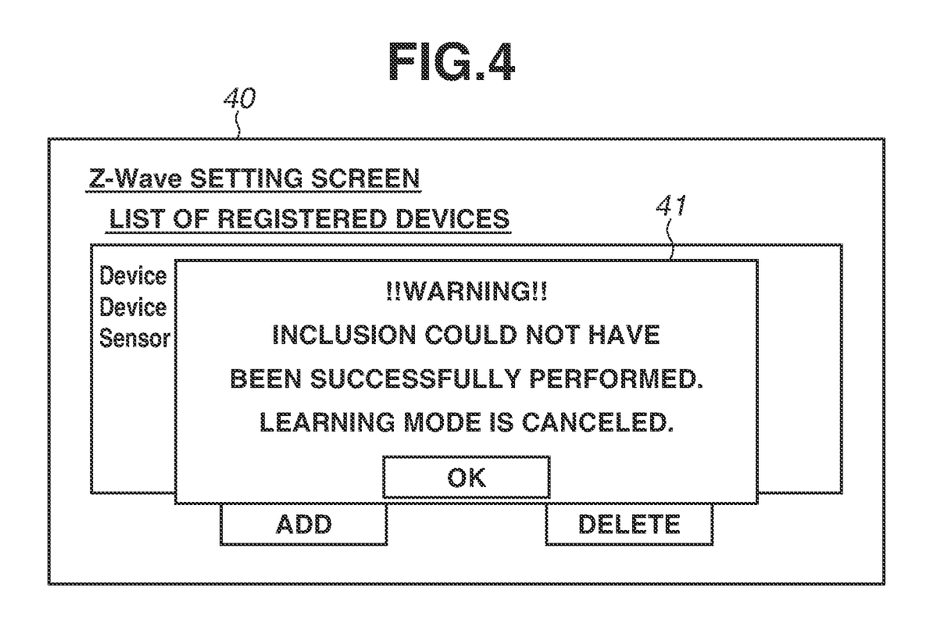
FIG. 4 illustrates an example of a display message notified to the information terminal of inclusion failure of the communication apparatus according to the present exemplary embodiment.

FIG. 4 illustrates an example of a warning message that the system control unit 23 of the network camera 2 outputs in step S9 to notify of the inclusion failure.

Referring to FIG. 4, the system control unit 23 of the network camera 2 displays, for example, a pop-up warning message 41 on a screen 40, which is a viewer or setting screen on the information terminal 4, via the network 6. If the OK button is pressed on the warning message 41 by the user, the pop-up display closes.

However, the warning message illustrated in FIG. 4 is an example, and the present exemplary embodiment is not limited thereto. The warning message can be in any form as long as it is possible to notify the user of an inclusion failure event. For example, if the network camera 2 and the information terminal 4 are not connected via the network 6, the system control unit 23 may notify the user of the warning by a flickering pattern of a light-emitting diode (LED) mounted on the network camera 2.

Returning to FIG. 3, if the inclusion has been performed in step S6 (YES in step S6), the processing proceeds to step S7. In step S7, the system control unit 23 of the network camera 2 transmits device information regarding the network camera 2. This device information is identification information used by the network camera 1, which is the master unit, to identify a desired replacement camera. For example, in the Z-Wave standard, the role of a device is defined in the standard, and the device is categorized according to a device type. The master unit can acquire the device type of the slave unit by the inclusion and thereby can identify what kind of device the slave unit is.

Since an ID for identifying each device can be defined in a product, the master unit may use this ID to identify the slave unit. Alternatively, the information may be in any form, such as a serial number or media access control (MAC) address of the device, as long as the replacement camera can be identified from the information.

After the system control unit 23 of the network camera 2 transmits its own device information in step S7, the processing proceeds to step S11. In step S11, the system control unit 23 determines whether the master unit function defined in the Z-Wave standard has been handed over. Specifically, the system control unit 23 executes the handover operation of the master unit function defined in the Z-Wave standard. By transmitting a handover request from the master unit to the slave unit or from the slave unit to the master unit, the handover operation of the master unit function can be started.

In the present exemplary embodiment, after the master unit has identified the replacement camera from the device information received in step S7, the handover operation of the master unit function in the Z-Wave standard may be started automatically by the master unit transmitting a handover request to the slave unit.

An apparatus that operates as a master unit in the Z-Wave standard is referred to as a primary controller. In the same network, only one primary controller can exist. The primary controller has a function or authority capable of registering a device within the Z-Wave standard network. Herein, the network camera 1 loses the master unit function by handing over the function of this primary controller to the network camera 2, and operates as a slave unit. The handover is performed by transmitting, from the network camera 1 to the network camera 2, a signal including an instruction (information) for the network camera 2 to operate as the primary controller.

If the master unit function has been successfully handed over (YES in step S11), the processing proceeds to step S12 to notify the user of that the handover operation of the master unit function has been successfully executed. In step S13, the replacement mode is canceled, and the processing ends. The notification to the user in step S12 can be made in the same manner as in step S9. The notification can be in any form as long as the notification is a means to enable the user to recognize the successful end of the handover operation.

If the master unit function has not been successfully handed over (NO in step S11), the processing proceeds to step S14 to notify the user of a warning that the handover operation has not been successfully performed.

Figure 5:
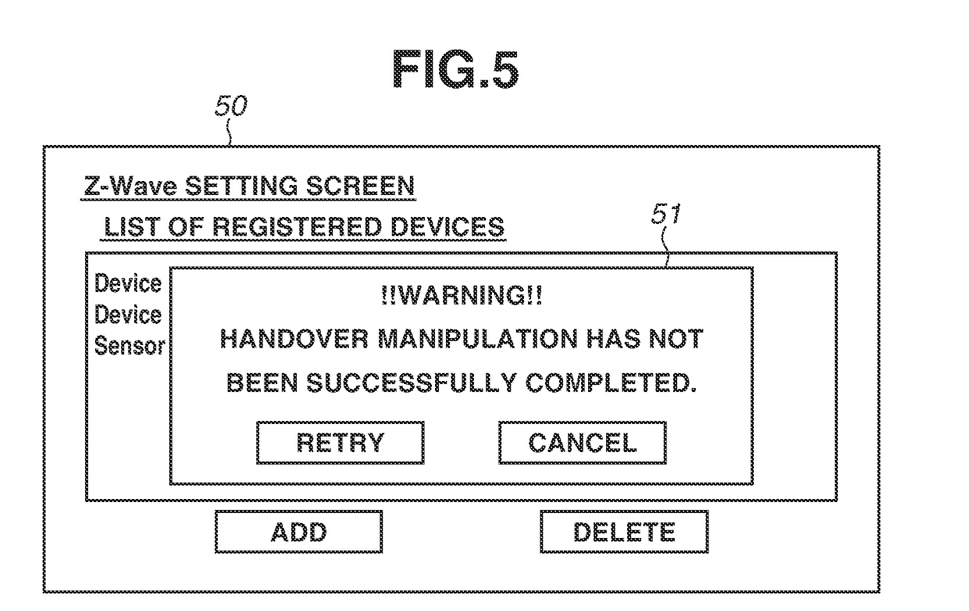
FIG. 5 illustrates an example of a display message notified to the information terminal of handover processing failure to the communication apparatus according to the present exemplary embodiment.

FIG. 5 illustrates an example of a warning message that the system control unit 23 of the network camera 2 outputs in step S14 to notify that the handover operation of the master unit function has not been successfully executed.

Referring to FIG. 5, the system control unit 23 of the network camera 2 displays, for example, a pop-up warning message 51 on a screen 50, which is a viewer or setting screen on the information terminal 4, via the network 6. This pop-up display of the warning message 51 includes options of "Retry" and "Cancel" and may allow the user to select and instruct a retry of the handover operation of the master unit function. When the "Retry" button is pressed in the pop-up display, the handover operation is executed again. If the "Cancel" button is pressed, the pop-up display closes.

The warning message illustrated in FIG. 5 may be output to a manipulation screen if the network camera 2 has the manipulation screen.

The warning message illustrated in FIG. 5 is an example, and the present exemplary embodiment is not limited thereto. The warning message can be in any form as long as it is possible to notify the user that the handover operation of the master unit function has not been successfully ended. For example, if the network camera 2 and the information terminal 4 are not connected via the network 6, the system control unit 23 may notify the user of the warning by a flickering pattern of a light-emitting diode (LED) mounted on the network camera 2.

<Handover Processing Flow of Master Unit Function by Network Camera 1>

Figure 6:
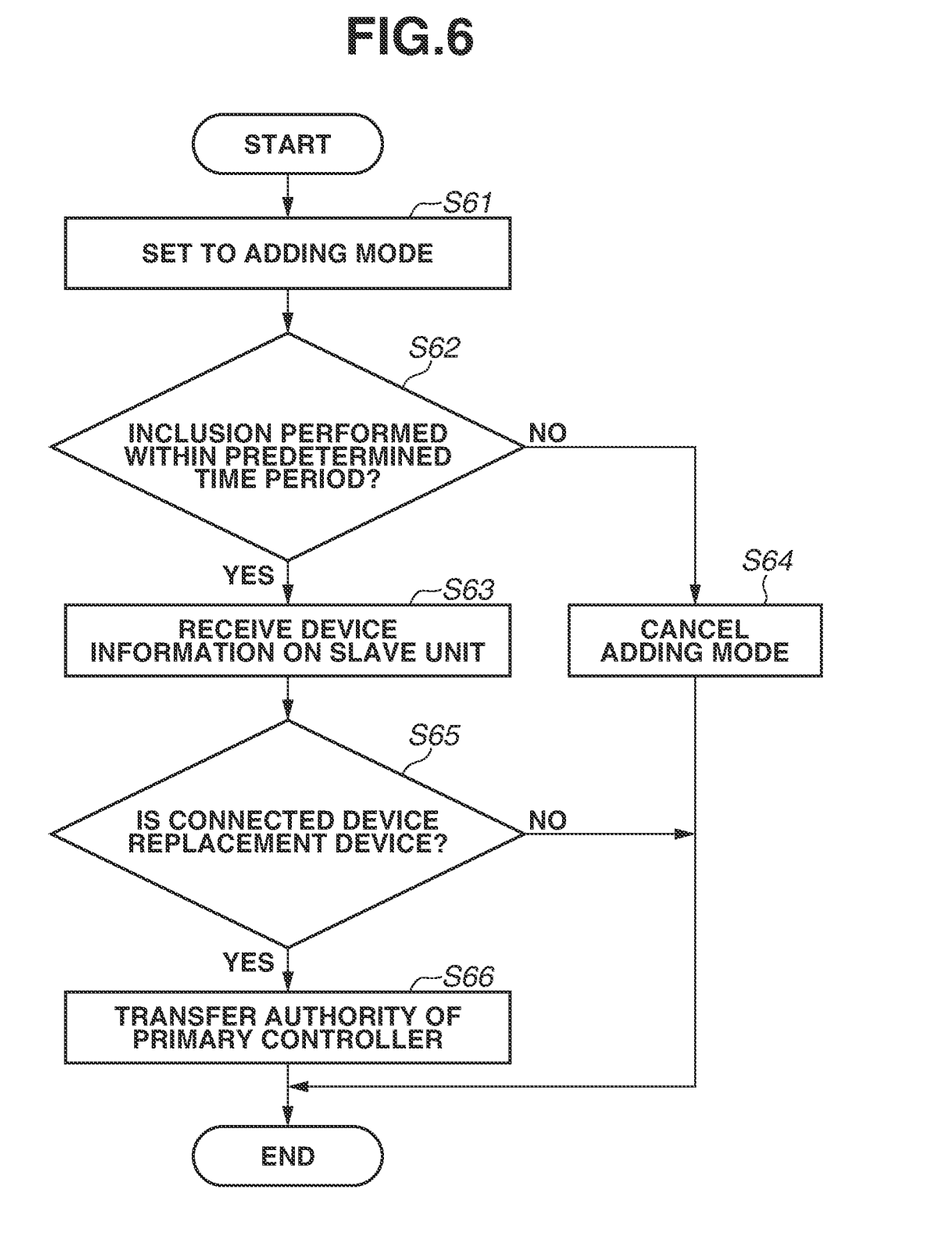
FIG. 6 is a flowchart illustrating an example of a detailed procedure of handover processing at a time of replacement with a replacement origin communication apparatus according to the present exemplary embodiment.

Hereinafter, an example of a handover processing flow will be described with reference to FIG. 6. The processing is executed by the network camera 1, which is a replacement target in the present exemplary embodiment. The master unit function in accordance with the Z-Wave standard is handed over from the network camera 1 to the network camera 2.

In step S61, the system control unit 23 of the network camera 1 sets the network camera 1 to an adding mode. For example, when the user presses a push button mounted on a device, the network camera 1 can be transitioned to the state of the adding mode. Alternatively, the network camera 1 may be transitioned to the adding mode by allowing the user to manipulate from the setting screen of the information terminal 4.

In a case where a plurality of the same network cameras is installed, the user can select a network camera, which is a replacement target, from among the plurality of network cameras, and perform the transition manipulation of the selected network camera to the adding mode.

The above is an example, and any form can be used as long as the manipulation can set the adding mode in the Z-Wave standard. For example, the network camera 1 may be initially set so that the network camera 1 automatically activates in the adding mode when the power is turned on. When a different Z-Wave compatible device enters the learning mode in this state, the inclusion is executed, and the network camera 1 and the different Z-Wave device can be connected.

In step S62, the system control unit 23 of the network camera 1 detects whether the slave unit has undergone the inclusion within a predetermined time. The specific detection method is the same as that in step S6 in FIG. 3. If the inclusion of the slave unit has been detected within the predetermined time (YES in step S62), the processing proceeds to step S63. In step S63, the system control unit 23 of the network camera 1 receives the device information on the slave unit via the network 5.

On the other hand, if the inclusion of the slave unit has not been detected within the predetermined time (NO in step S62), the processing proceeds to step S64 to cancel the adding mode, and the processing ends.

After the device information on the slave unit has been received in step S63, the processing proceeds to step S65. In step S65, the system control unit 23 of the network camera 1 identifies whether the device of the transmission source of the device information is a replacement camera based on the received device information. The network camera 1 stores the device information defined in advance, and compares the device information obtained from the device connected to the wireless network 5 with the stored device information. The network camera 1 can then identify whether the device is the replacement camera. However, the above is an example, and any form can be used as long as the identification method is a means capable of identifying whether the device is the replacement camera.

If the connected device is the replacement camera (YES in step S65), the processing proceeds to step S66. In step S66, the authority of the primary controller is transferred to the slave unit that has been identified as the replacement camera. If the connected device is not the replacement camera (NO in step S65), step S66 is skipped, and the processing ends.

As described above, according to the present exemplary embodiment, the communication apparatus automatically transitions to the replacement mode, when the device is replaced on the wireless communication network. The transition is triggered by the restoration of the setting values to be handed over. In the replacement mode, the communication apparatus establishes the wireless communication with the master unit and then automatically shifts to the learning mode in which the communication apparatus waits for the inclusion from the master unit. The communication apparatus performs the handover processing by setting the master unit function (primary controller) received from the master unit via the established wireless communication to the communication apparatus.

Therefore, it is possible to simplify the replacement of communication devices configuring the wireless communication network and improve the convenience in maintenance.

The present invention can also be realized by a program that realizes part or one or more functions of the above-described embodiments. That is, the present invention can be realized by supplying the program to a system or apparatus via a network or storage medium and reading out and executing the program by one or more processors in a computer (or a CPU, microprocessor unit (MPU), or the like) of the system or apparatus. Furthermore, the program may be provided by being recorded on a computer-readable recording medium.

In addition, the functions of the exemplary embodiments are not realized only by executing the program read out by the computer. For example, an operating system (OS) running on a computer may perform some or all of the actual processing based on the instructions in the program, and the functions of the above-described embodiments may be realized by the processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-014242, filed Jan. 30, 2019, which is hereby incorporated by reference herein in its entirety.

What is claimed is:

1. A communication apparatus comprising:
a first setting unit configured to acquire first setting information for controlling the communication apparatus from an outside and to set the first setting information in the communication apparatus;
an establishment unit configured to establish wireless communication with a different communication apparatus;
a second setting unit configured to hand over second setting information from the different communication apparatus via the wireless communication established by the establishment unit and set the second setting information in the communication apparatus, the second setting information indicating authority of the different communication apparatus in the wireless communication; and
a control unit configured to control the establishment unit to establish the wireless communication and to control the second setting unit to set the second setting information in the communication apparatus in a case where the first setting information is set in the communication apparatus by the first setting unit,
wherein the wireless communication established by the establishment unit is wireless communication that conforms to a Z-Wave standard,
wherein the second setting information is information related to a primary controller, and
wherein the control unit is further configured to shift the communication apparatus to a learning mode that enables exchanging information necessary for the wireless communication with the different communication apparatus in a case where the first setting information is set in the communication apparatus by the first setting unit.

2. The communication apparatus according to claim 1, wherein the second setting information set in the communication apparatus by the second setting unit indicates the authority of operating as a master unit in the wireless communication.

3. The communication apparatus according to claim 1, the communication apparatus further comprising a transmission unit configured to transmit identification information to the different communication apparatus via the wireless communication established by the establishment unit, the identification information identifying the communication apparatus,
wherein the second setting unit is configured to receive the second setting information transmitted from the different communication apparatus based on the identification information transmitted by the transmission unit.

4. The communication apparatus according to claim 1, wherein the control unit is configured to detect that the communication apparatus has been registered as a slave unit in a network of the wireless communication established by the establishment unit and to cause the second setting unit to set the second setting information in the communication apparatus in a case where the communication apparatus is detected to be registered as the slave unit in the network of the wireless communication.

5. The communication apparatus according to claim 1, the communication apparatus further comprising a storage unit configured to store flag information indicating whether the first setting information has been set in the communication apparatus by the first setting unit,
wherein the control unit is configured to cause the communication apparatus to activate in an operation mode that causes the establishment unit to automatically establish the wireless communication if the flag information stored in the storage unit indicates that the first setting information has been set.

6. The communication apparatus according to claim 1, wherein, in a case where the communication apparatus is not registered as a slave unit within a predetermined time in a network of the wireless communication established by the establishment unit, the control unit is configured to
cancel a state of being able to establish the wireless communication by the establishment unit, and
notify that the communication apparatus has not been registered as the slave unit in the network of the wireless communication.

7. The communication apparatus according to claim 1, wherein the control unit is configured to notify of encouraging retry of setting the second setting information in the communication apparatus if the second setting information has not been set in the communication apparatus by the second setting unit.

8. The communication apparatus according to claim 1, wherein the first setting information set in the communication apparatus by the first setting unit includes at least part of setting information backed up from the different communication apparatus.

9. The communication apparatus according to claim 1, wherein the control unit is configured to transmit a device type to identify the communication apparatus to the different communication apparatus in a case where inclusion of the communication apparatus is detected in a network of the wireless communication.

10. The communication apparatus according to claim 9, wherein the control unit detects the inclusion of the communication apparatus by detecting that a home identification (ID) has been assigned from the different communication apparatus, the home ID indicating a network to which the communication apparatus belongs.

11. A storage medium that stores a program for causing a computer to function as each unit of the communication apparatus according to claim 1.

12. A control method of a communication apparatus, the control method comprising:
acquiring first setting information for controlling the communication apparatus from an outside and setting the first setting information in the communication apparatus;
establishing wireless communication with a different communication apparatus;
handing over second setting information from the different communication apparatus via the established wireless communication, and setting the second setting information in the communication apparatus, the second setting information indicating authority of the different communication apparatus in the wireless communication; and
controlling the establishment of the wireless communication and the setting of the second setting information in the communication apparatus in a case where the first setting information is set in the communication apparatus,
wherein the established wireless communication is wireless communication that conforms to a Z-Wave standard,
wherein the second setting information is information related to a primary controller, and
wherein the communication apparatus further performs control to shift the communication apparatus to a learning mode that enables exchanging information necessary for the wireless communication with the different communication apparatus in a case where the first setting information is set in the communication apparatus.

* * * * *